United States Patent
Betley et al.

(10) Patent No.: US 11,421,799 B1
(45) Date of Patent: Aug. 23, 2022

(54) ACCURACY OF CONTROL VALVES USING A LONG-STROKE POSITION CONVERTER

(71) Applicant: Dresser, LLC, Houston, TX (US)

(72) Inventors: Justin Walter Betley, Raynham, MA (US); John Gregory Canning, Kingston, MA (US)

(73) Assignee: Dresser, LLC, Houston, TX (US)

( * ) Notice: Subject to any disclaimer, the term of this patent is extended or adjusted under 35 U.S.C. 154(b) by 0 days.

(21) Appl. No.: 17/226,932

(22) Filed: Apr. 9, 2021

(51) Int. Cl.
*F16K 31/06* (2006.01)
*F16K 37/00* (2006.01)

(52) U.S. Cl.
CPC ...... *F16K 37/0008* (2013.01); *F16K 37/0033* (2013.01); *Y10T 137/8242* (2015.04); *Y10T 137/8275* (2015.04)

(58) Field of Classification Search
CPC ......... Y10T 137/8275; Y10T 137/8242; F16K 37/0033
See application file for complete search history.

(56) References Cited

U.S. PATENT DOCUMENTS

| | | | | |
|---|---|---|---|---|
| 3,390,943 A * | 7/1968 | Myers | ..................... | F16K 17/10 137/66 |
| 4,877,059 A * | 10/1989 | Popescu | .................. | F16K 47/08 137/637.1 |
| 5,218,994 A * | 6/1993 | Jeschke | .................. | F16K 31/126 137/554 |
| 5,277,223 A * | 1/1994 | Glockner | ............ | F16K 37/0008 137/554 |
| 10,066,761 B1* | 9/2018 | Hernu | .................. | F16K 37/0025 |
| 2003/0136929 A1* | 7/2003 | Clemens | ............. | F16K 37/0033 137/554 |
| 2004/0154466 A1* | 8/2004 | Gethmann | .......... | F16K 37/0008 92/5 R |
| 2011/0155250 A1* | 6/2011 | Nannan | ................. | F16K 31/122 137/553 |
| 2014/0116542 A1* | 5/2014 | Feinauer | ............. | F16K 37/0041 137/554 |
| 2015/0053283 A1* | 2/2015 | Robson | ..................... | F16K 5/04 137/554 |

OTHER PUBLICATIONS

Baker Hughes, Masoneliean 49000 Series Energy Management Control Valve Instruction Manual (Rev. D), 2020.

* cited by examiner

*Primary Examiner* — Robert K Arundale
(74) *Attorney, Agent, or Firm* — Paul Frank + Collins P.C.

(57) ABSTRACT

A position transfer device is configured for use on a control valve. These configurations may convert a linear position of a closure member on the control valve to an angular position of magnets. A sensor in proximity to the magnets can generate a signal in response to the angular position. In one implementation, a valve positioner or controller can process the signal to identify the position of the closure member relative to a seat.

20 Claims, 7 Drawing Sheets

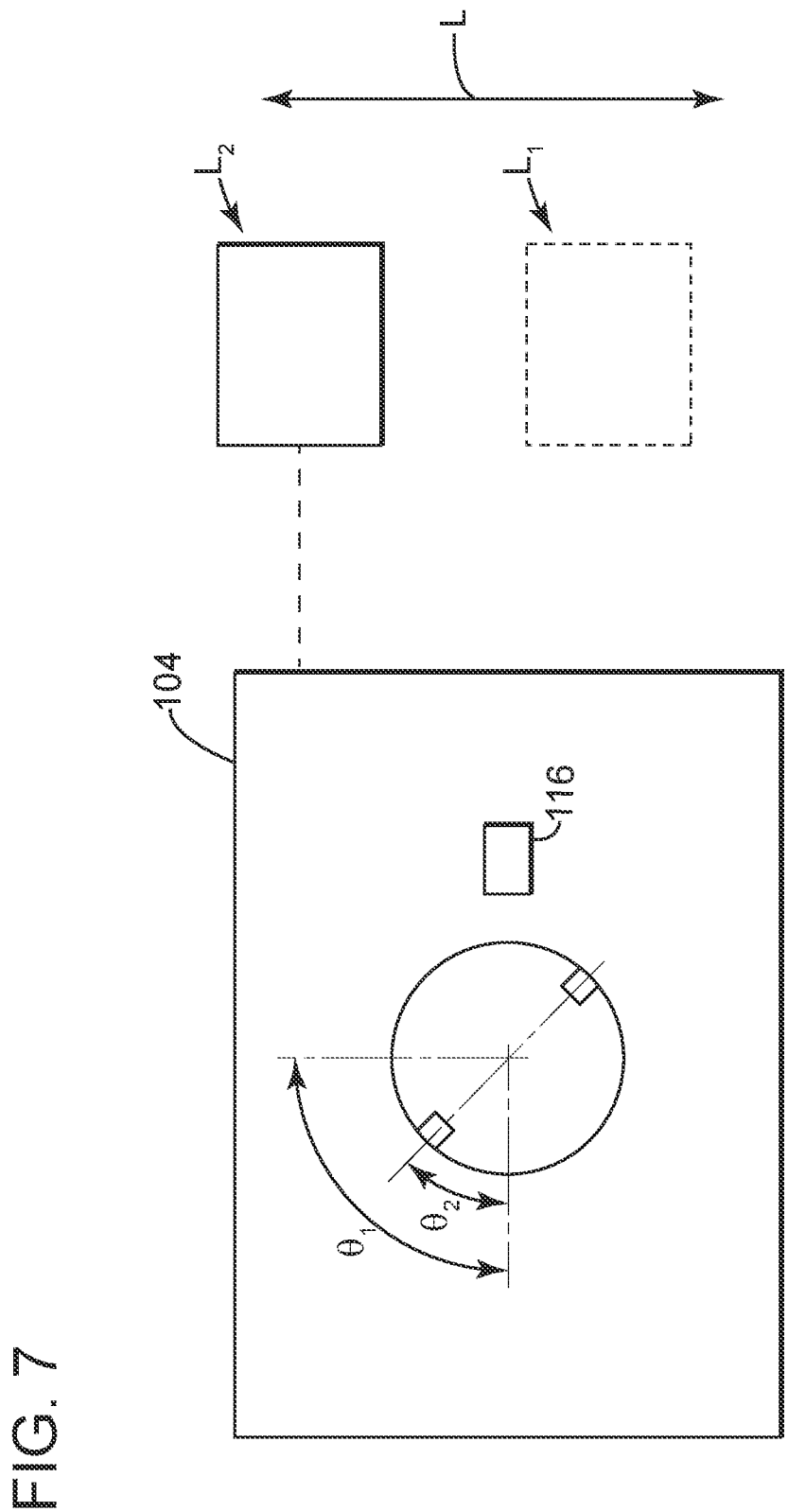

ACCURACY OF CONTROL VALVES USING A LONG-STROKE POSITION CONVERTER

BACKGROUND

Flow controls operate in myriad applications. Control valves are a type of flow control that find use in industrial facilities, including as part of process lines. Designs for these devices are meant to accurately regulate flow to meet process parameters. It follows that accuracy issues with control valves may disrupt processes in a way that lower yields or reduces quality. In large, industrial operations, these problems may lead to significant expense due to downtime necessary to troubleshoot and repair or replace the problematic device(s).

SUMMARY

The subject matter of this disclosure relates to improvements to address accuracy issues in control valves. Of particular interest are embodiments of a device or mechanism that can convert a linear position to an angular position. Devices of the proposed designs may include a linearly translating shaft that forms an inclined surface. A rotatable mechanism may contact the inclined surface. In one implementation, this mechanism can register an angular position that correlates with a point-of-contact on the inclined surface. This feature is beneficial because it provides a measure of component position in control valves that is more reliable and more accurate than conventional linkage mechanisms because the proposed designs are much less complex and not susceptible to vibration or other influence that can affect measurements.

Measurement accuracy is important to various operations on the control valve. For example, the position measurement is critical to maintain a closure member in precise position relative to a seat. This position regulates flow to achieve appropriate process parameters. Control valves may also use the position measurement to engage certain operating "modes" on the device. Its "fully-opened" mode will ensure that the closure member reaches it farthest position from the seat. The "tight shut-off" mode may locate the closure member in its closed position (in contact with the seat) in response to commanded positions below a "lower" limit. For example, if the lower limit is 10%, the closure member contacts the seat at commanded positions below 10% and operate as normal for commanded positions above 10%. The tight shut-off mode is useful to prevent operating conditions that arise with the closure member in close proximity to the seat. These operating conditions cause the working fluid to flow at high flow rates or velocity that can cause wear and damage that can degrade performance and life span of the valve assembly.

DRAWINGS

Reference is now made briefly to the accompanying drawings, in which:

FIG. 7 depicts a schematic diagram of an example of the position transfer device of FIG. 1 with magnets in a second angular position.

Figure 1:
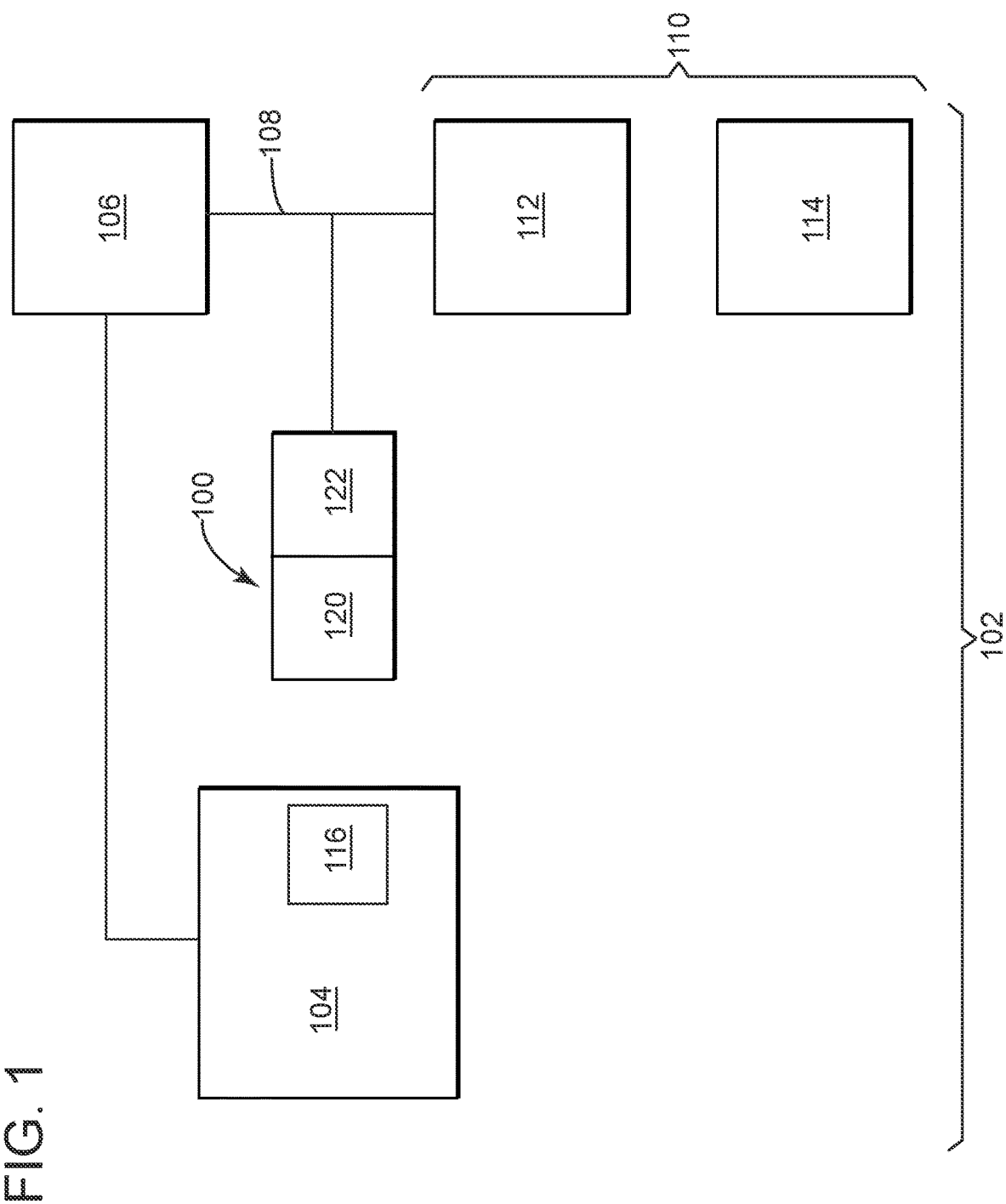
FIG. 1 depicts a schematic diagram of a position transfer device for use on a control valve.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

The drawings and any description herein use examples to disclose the invention. These examples include the best mode and enable any person skilled in the art to practice the invention, including making and using any devices or systems and performing any incorporated methods. An element or function recited in the singular and proceeded with the word "a" or "an" should be understood as not excluding plural of said elements or functions, unless such exclusion is explicitly recited. References to "one embodiment" or "one implementation" should not be interpreted as excluding the existence of additional embodiments or implementations that also incorporate the recited features.

DESCRIPTION

The discussion now turns to describe features of the embodiments shown in drawings noted above. These embodiments foreclose the need for mechanical linkages to measure component position on control valves. These linkages are often large and bulky. They also tend to extend well outside of the structural envelope of the control valve. On the other hand, the designs herein fit entirely within this structural envelope. Other embodiments may be contemplated within the scope of this disclosure.

FIG. 1 depicts a schematic diagram of an exemplary embodiment of a position transfer device 100. This example is part of a valve assembly 102 that includes a valve positioner 104 (or "controller 104") that couples with an actuator 106. A valve stem 108 may connect the actuator 106 with a valve 110. This feature allows the actuator 106 to regulate movement of a closure member 112 relative to a seat 114. The controller 104 may also include a position sensor 116. As shown, the position transfer device 100 may include a sensor target unit 120 in proximity to the position sensor 116. The sensor target unit 120 may communicate with a transfer unit 122 that couples with the valve stem 108.

Broadly, the position transfer device 100 may be configured to convert a linear position to an angular position. These configurations may employ components that can connect to a linear drive or linear load, which are typical of many flow controls (including control valves). The components of the device 100 may fit into a small, compact form factor. This feature may provide a mechanism that is more robust because it is less susceptible to outside influences like vibration that can frustrate use of conventional linkages systems on control valves. As an added benefit, the proposed components and mechanisms may integrate with one another in a way that reduces or eliminates "backlash" or "play" in the measurement system. This feature can provide measured values that are more accurate than any conventional linkage in the field.

The valve assembly 102 may be configured for use in systems that transport materials. These configurations may connect in-line with conduit, like pipes and pipelines, as part of a process line or lines that transfer fluids. Hydrocarbon operations are known to leverage these devices to regulate flow of oil & natural gas (including liquefied natural gas or "LNG") from points of extraction to process facilities or within the process facilities themselves.

The controller 104 may be configured to exchange and process signals. These configurations may connect to a control network (or "distributed control system" or "DCS"), which maintains operation of all devices on the process lines to ensure that materials flow in accordance with a process. The DCS may generate control signals with operating parameters that describe or define operation of the valve assembly 102 for this purpose. For example, the operating parameters may define a commanded position for the valve assembly 102.

The actuator 106 may be configured to generate a load that works against pressure of material. These configurations may employ pneumatic devices, although electrical or electronic devices (e.g., motors) may work as well. Pneumatic devices may have a diaphragm internal to a housing. In operation, the controller 104 may deliver gas, or "instrument air," as a pneumatic signal. This instrument air signal changes pressure or load against the diaphragm inside of the housing of the actuator 106. The stem 108 directs the load to the valve 110. Parameters for the pneumatic signal depend in large part on the commanded position for the valve assembly 102.

The valve 110 may be configured to fix parameters of flow into the process line. These configurations often include hardware that couples with the pipes or pipeline. Manufacture of this hardware often comports with properties of the materials, including its composition or "phase," for example, solid, fluid, or solid-fluid mix. The closure member 112 may embody a plug, ball, butterfly valve, or like implement that can contact with the seat 114 to prevent flow. Location of the closure member 110 relative to the seat 112 permits more or less flow of material to pass through the valve 106 to satisfy the process parameters.

The position sensor 116 may be configured to generate data. These configurations may use non-contact modalities (e.g., magnetics) to generate values for a measured position of the closure member 110. In operation, the controller 104 may process signals from both the DCS and the positioner sensor 116 to set the pneumatic signal that operates the actuator 106 to maintain the closure member 112 at the commanded position. This features ensures flow of material through valve 106 to meet process parameters. The use of non-contact modalities allows the controller 104 to easily separate from (and install onto) the valve assembly 102. This feature simplifies maintenance and, in some applications, allows technicians to remove and replace the controller 104 as part of tasks to repair, upgrade, or maintain the device.

The sensor target unit 120 may be configured to convey an angular position. These configurations may embody devices that interface with the non-contact modality of the sensor 116. These devices may include magnets, particularly if the sensor 116 is of a type that is responsive to magnetic fields, like a hall-effect sensor. However, other devices may prevail that corresponds with the type of the sensor 116. These other types may employ optical or ultrasonic technologies, for example.

The transfer unit 122 may be configured to set this angular position. These configurations may embody devices that move in concert with the linear drive of the valve assembly 102. These devices may include linearly translating shafts; although rotatable mechanics may prevail as well. In one implementation, the translating shaft can set the angular position of the sensor target unit 120 to correspond with the position of the linear drive and, ultimately, the closure member 112.

Figure 2:
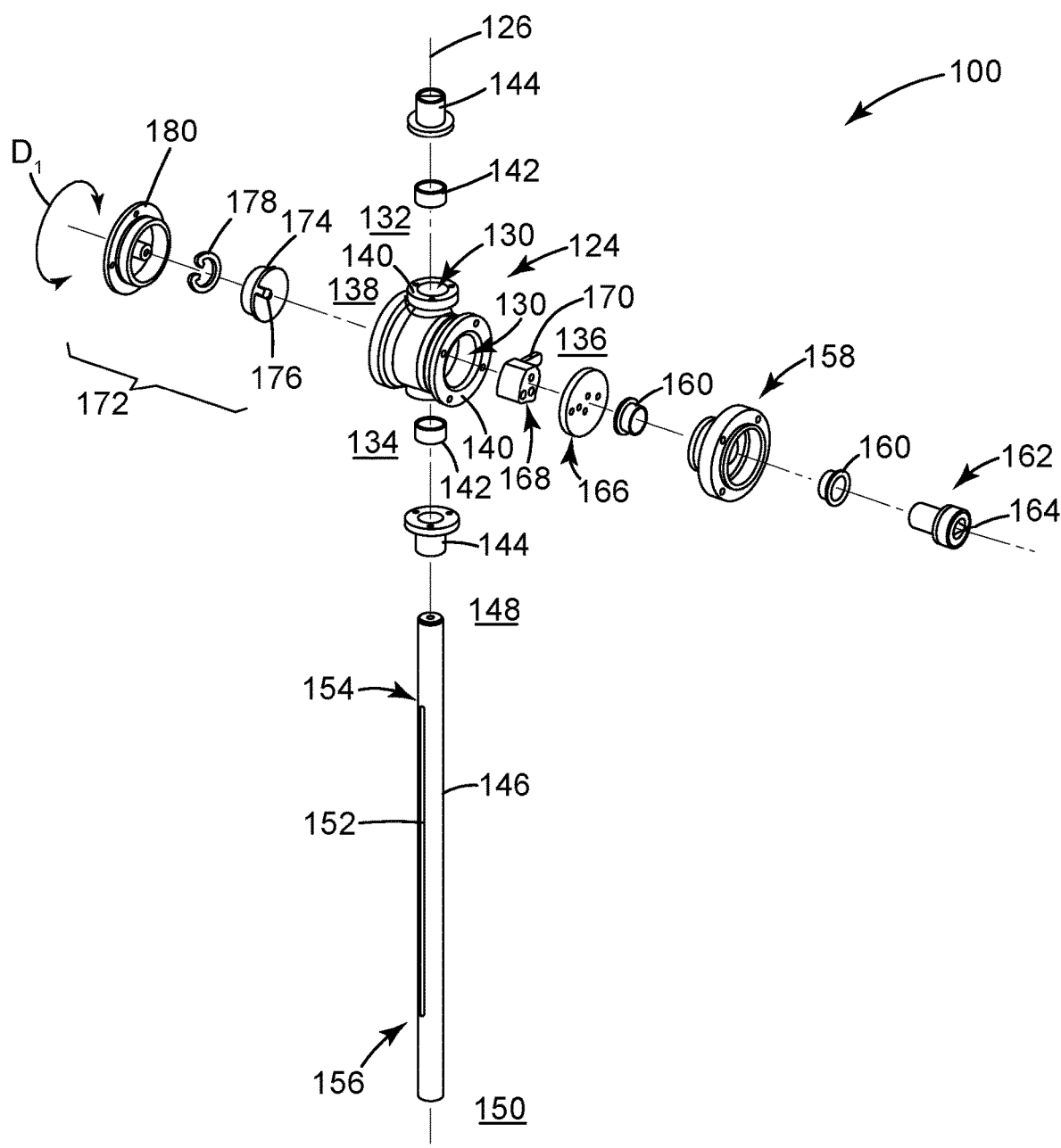
FIG. 2 depicts a perspective view of exemplary structure for the position transfer device in exploded form.

FIG. 2 depicts a perspective view of an example of structure for the position transfer device 100 of FIG. 1 in exploded form. This structure may include a main body 124 with an internal bore structure that creates perpendicular axes 126, 128. The bore structure may terminate at openings 130 on the main body 124, shown here on opposing sides 132, 134 and opposing sides 136, 138, respectively. Flanges 140 may circumscribe each of the openings 130. In one example, the structure may include bushings 142 that insert into the openings 130 on the sides 132, 134. Seals 144 may secure to the flanges 140 on the sides 132, 134 as well. Both the bushings 142 and the seals 144 may have bores to accommodate a shaft 146 that can insert through the main body 124. The shaft 146 may have ends 148, 150. A slot 152 may penetrate its surface. The slot 152 may extend lengthwise along the shaft 146, terminating at locations 154, 156 that are set inwardly from the ends 148, 150.

The structure may be configured with components to create an angular position that reflects a linear position of the shaft 146. This structure may include a rotary housing 158 that couples with the flange 140 on the side 136 of the main body 124. Bushings 160 may reside in bores of the rotary housing 158. The bushings 160 may have a through-bore that receives a first portion of a sensor interface 162. Magnets 164 may reside in a second portion of the sensor interface 162. The magnets 164 may be arranged diametrically opposite to one another. Often, the second portion of the sensor interface 162 has a larger outer diameter than the first portion. A disc 166 may affix to an exposed end of the first portion of the sensor interface 162. The disc 166 may couple with a pin member 168, shown here with a boss 170 that is perpendicular to the axis 128. In one implementation, the structure may include a biasing unit 172 that can bias the pin member 168 in one direction $D_1$ about the axis 128. The biasing unit 172 may include a spring plate 174 with a boss 176 that extends parallel to the axis 128. The boss 176 may engage with a corresponding aperture on the pin member 168. The biasing unit 172 may use a spring 178, typically a coil spring or torsion spring. The spring 178 may reside in the spring plate 174. In one example, a cover 180 may secure to the flange 140 on the side 138 to enclose the biasing unit 172, including the coil spring 178, inside the bore structure of the main body 124.

Figure 3:
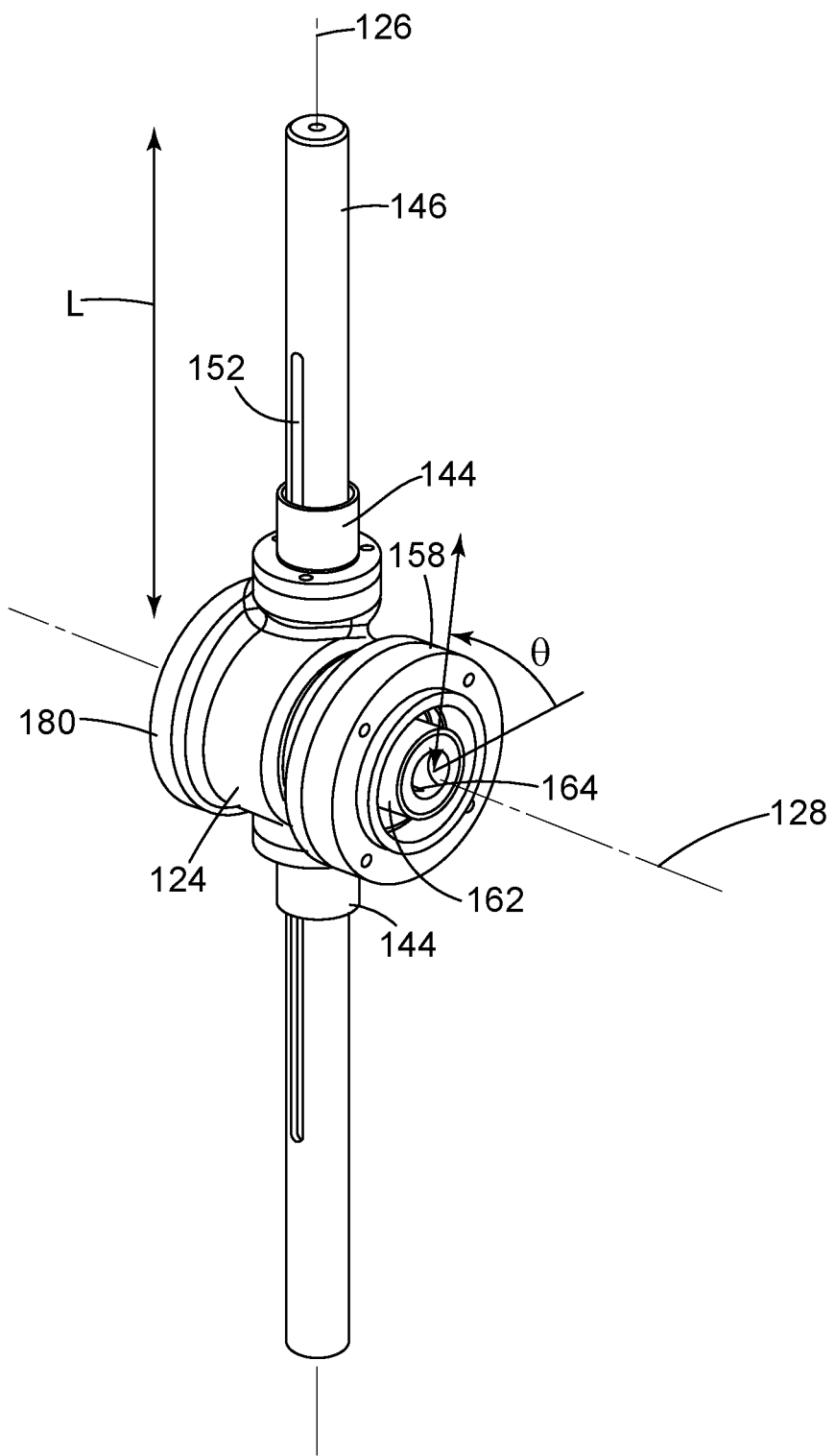
FIG. 3 depicts a perspective view of the exemplary structure of FIG. 2 in assembled form.

FIG. 3 depicts a perspective view of the position transfer device 100 of FIG. 2 in assembled form. The assembly can set an angular position θ for the magnets 164 on sensor interface 162 about the axis 128. This angular position may corresponds with a linear position L of the shaft 146 on the axis 126.

Figure 4:
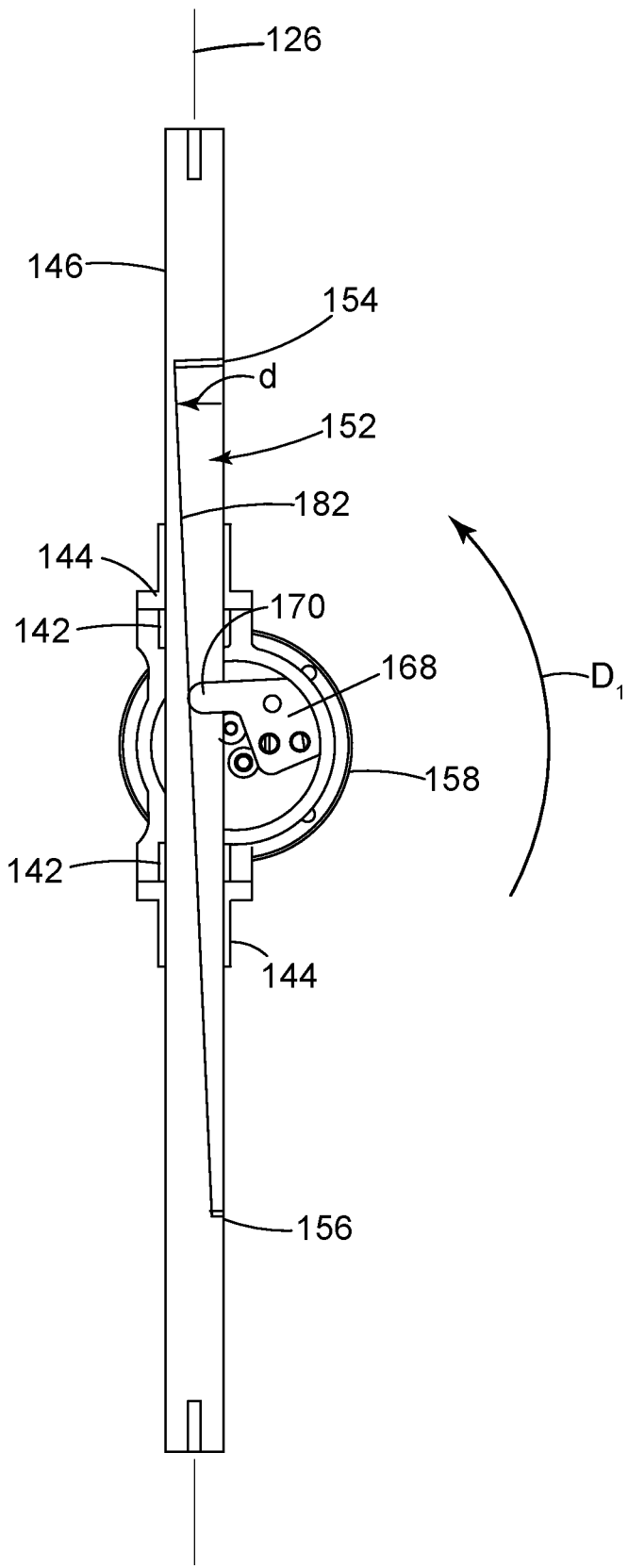
FIG. 4 depicts an elevation view of the cross-section of the exemplary structure of FIG. 3.

FIG. 4 depicts an elevation view of the cross-section of the position transfer device 100 of FIG. 3 taken at 4-4. The slot 152 may have a depth "d" that varies between locations 154, 156. In one implementation, the depth d may vary linearly to create an inclined surface 182. The boss 170 on the pin member 168 may contact the inclined surface 182. The coil spring 178 (FIG. 2) may create a pre-load or a pre-set tension the direction $D_1$. This pre-load will bias the pin member 168 against the inclined surface 182. In use, the point-of-contact of the boss 170 against the inclined surface 182 sets the angular position θ of the disc 166, which corresponds with the angular position θ for the magnets 164 on the sensor interface 162. Translation of the shaft 146 to different positions on the axis 126 (e.g., from a first position to a second position) will change the depth d of the slot 152 at the point-of-contact between the boss 170 and the inclined surface 182. This change in depth d will result in a different angular position θ. As the depth d increases at the point-of-contact, the pre-load in the coil spring 178 (FIG. 2) will force the pin member 168 in the direction $D_1$ to ensure that the boss 170 remains in contact with the inclined surface 182.

Figure 5:
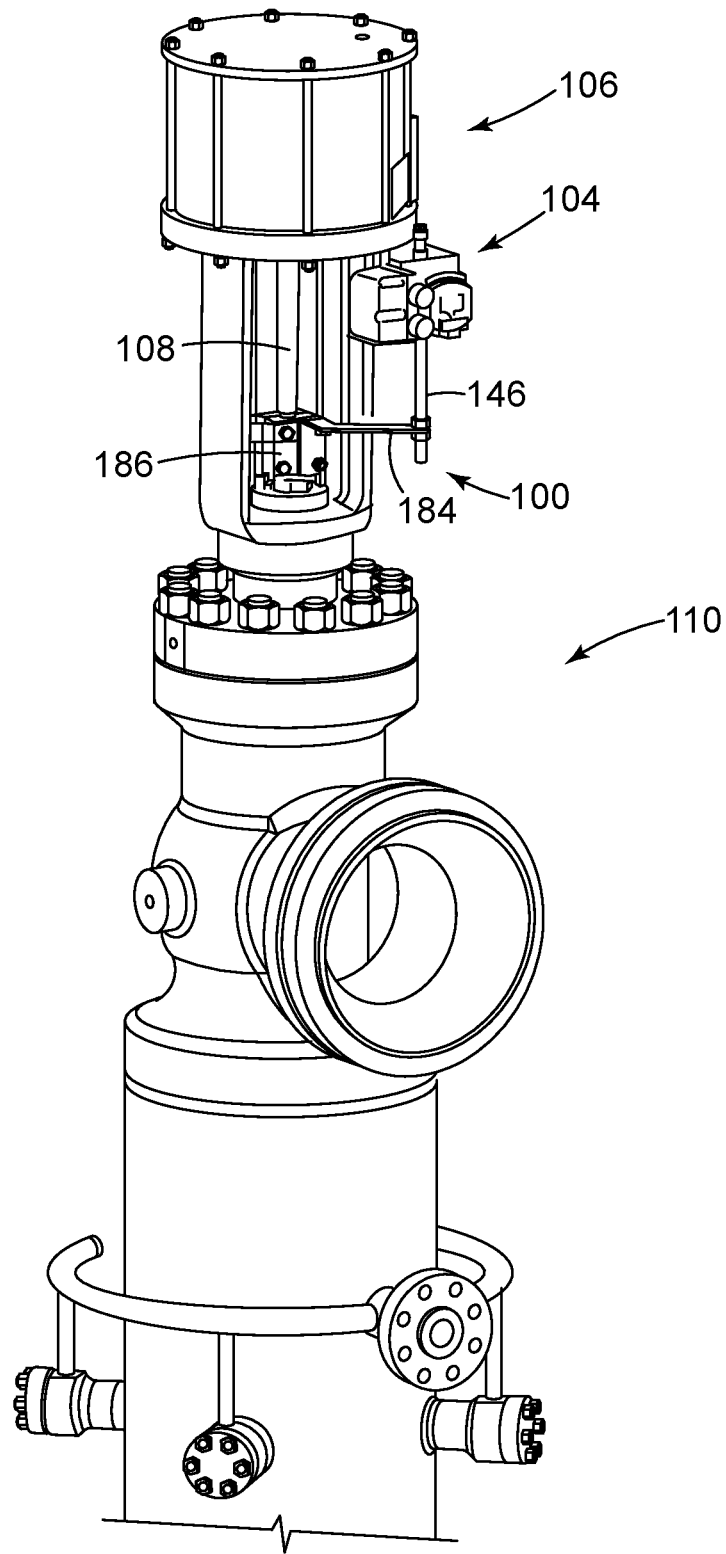
FIG. 5 depicts a perspective view of the exemplary structure of FIG. 3 in position on an example of a control valve.

FIG. 5 depicts a perspective view of the position transfer device 100 of FIG. 2 on an example of the valve assembly 102 of FIG. 1. The structure may mount with the magnets 164 (FIG. 3) in proximity to the sensor 116 (FIG. 1) on the controller 104. A tie bar 184 may couple one end of the shaft 146 to a transfer block 186 on the valve assembly 102. In this way, the position of the transfer block 186 transfers directly to the shaft 146 to set the angular position θ of the magnets 146 (FIG. 4).

Figure 6:
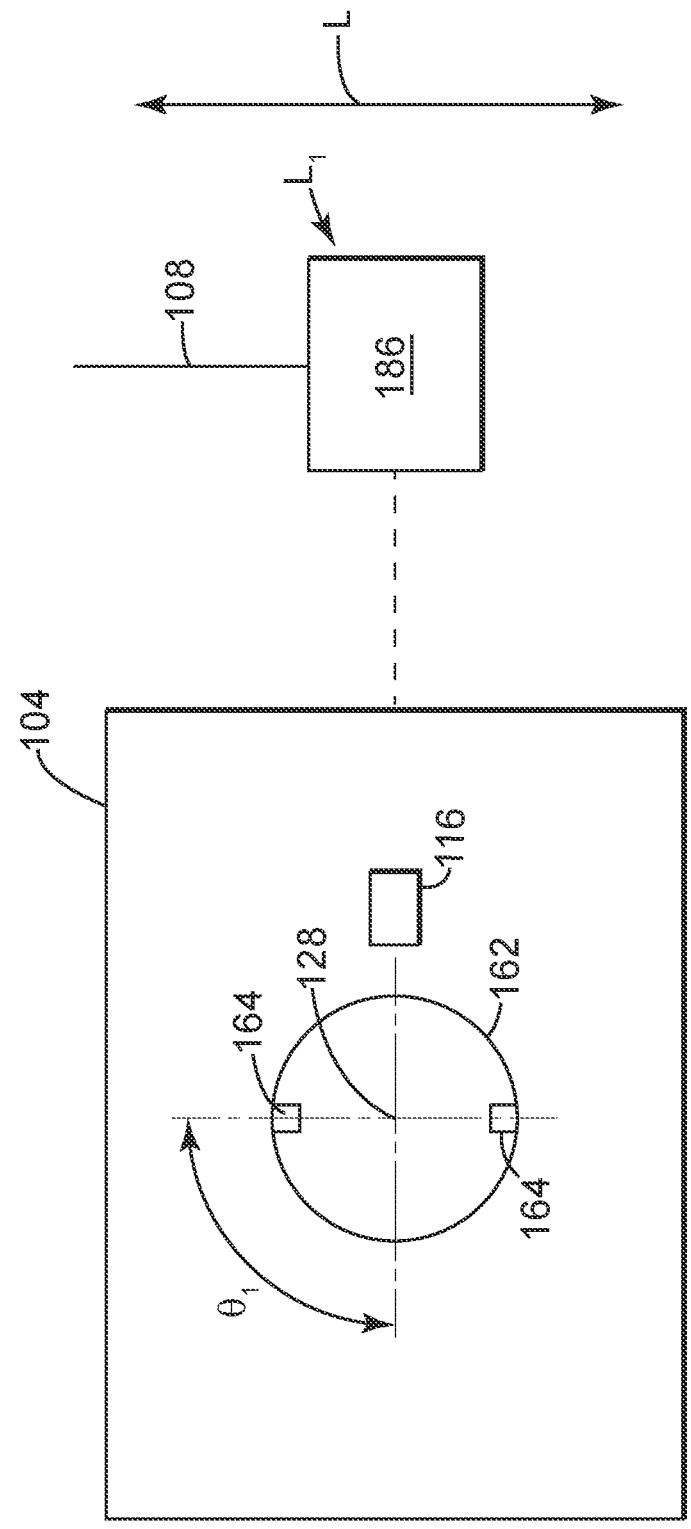
FIG. 6 depicts a schematic diagram of an example of the position transfer device of FIG. 1 with magnets in a first angular position.

FIGS. 6 and 7 depict a schematic diagram to illustrate operation of the device of FIG. 5. In FIG. 6, the magnets 164 have a first angular orientation $\theta_1$ that corresponds with a first linear position $L_1$ of the shaft 146. The tie bar 184 ensures that the first linear position $L_1$ corresponds with the position of the transfer block 186, which itself moves in concert with the valve stem 108. FIG. 7 shows the magnets 164 at a second angular orientation $\theta_2$ that corresponds with a second linear position $L_2$ of the shaft 146. This second linear position $L_2$ indicates that the transfer block 186 changes position, for example, moving upward in response to movement of the valve stem 108 (which, in turn, indicates the position of the closure member (not shown) in the valve assembly 102).

In view of the foregoing, the improvements herein better reflect operation of control valves or like flow controls. The mechanisms may result in more accurate measurement of the position of the closure member, as compared to the same measurements from conventional linkage measurement systems. The resulting values may, in turn, prove useful to maintain accuracy of the control valve.

Examples appear below that include certain elements or clauses one or more of which may be combined with other elements and clauses to describe embodiments contemplated within the scope and spirit of this disclosure. The scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A valve assembly, comprising:
   a pneumatic actuator;
   a valve stem coupled with the pneumatic actuator;
   a shaft coupled with the valve stem and configured to move concomitantly with the valve stem; and
   a rotatable mechanism coupled with the shaft, the rotatable mechanism comprising magnets that have an angular position that corresponds with a linear position of the valve stem.

2. The valve assembly of claim 1, further comprising:
   a slot that extends lengthwise in the shaft, wherein the rotatable mechanism engages with the slot.

3. The valve assembly of claim 1, further comprising:
   a slot that extends lengthwise in the shaft and has a variable depth, wherein the slot is configured to receive at least part of the rotatable mechanism to set the angular position of the magnets.

4. The valve assembly of claim 1, further comprising:
   an inclined surface disposed on the shaft, wherein the rotatable mechanism engages with the inclined surface.

5. The valve assembly of claim 1, further comprising:
   a biasing unit coupled with the rotatable mechanism, the biasing unit biasing the rotatable mechanism against the shaft.

6. The valve assembly of claim 1, further comprising:
   a coil spring engaging with the rotatable mechanism, the coil spring biasing the rotatable mechanism against the shaft.

7. The valve assembly of claim 1, wherein the shaft aligns with an axis that is parallel to the valve stem.

8. The valve assembly of claim 1, wherein the magnets rotate about an axis that is perpendicular to the shaft.

9. The valve assembly of claim 1, wherein the magnets comprise a pair of magnets disposed diametrically opposite from one another.

10. The valve assembly of claim 1, further comprising:
    a tie bar coupling an end of the shaft to the valve stem.

11. A valve assembly, comprising:
    a seat;
    a closure member moveable relative to the seat; and
    a position transfer device coupled with the closure member, the position transfer device having a first moveable member and a second moveable member including magnets, the first moveable member assuming a linear position that corresponds with a location for the closure member relative to the seat, the second moveable member setting an angular position for the magnets to correspond with the linear position of the first moveable member.

12. The valve assembly of claim 11, wherein the first moveable member translates in a direction that is the same as the closure member.

13. The valve assembly of claim 11, wherein the first moveable member translates on an axis that is parallel to an axis of travel for the closure member.

14. The valve assembly of claim 11, wherein the second moveable member rotates the magnets.

15. The valve assembly of claim 11, wherein the second moveable member rotates the magnets about an axis that is perpendicular to an axis of travel for the closure member.

16. A control valve, comprising:
    a valve with a closure member, a seat, a valve stem, and an actuator;
    a measurement system configured to measure a position of the closure member, the measurement system comprising:
    a sensor;
    a shaft coupled with the closure member, the shaft moveable along a first axis to a position that corresponds with a location for the closure member relative to the seat;
    a pair of magnets coupled with the shaft and in proximity to the sensor, the pair of magnets rotatable about a second axis that is perpendicular to the first axis.

17. The control valve of claim 16, wherein the measurement system comprises:
    a cylindrical body coupled with the shaft and holding the magnets diametrically opposite to one another.

18. The control valve of claim 16, wherein the measurement system comprises:

a rotatable disc aligned on the second axis and coupled with the shaft and the pair of magnets.

19. The control valve of claim 16, wherein the measurement system comprises:

a coil spring that biases the pair of magnets to one direction about the second axis.

20. The control valve of claim 16, wherein the measurement system comprises:

a tie bar that couples the shaft to the valve stem.

\* \* \* \* \*